United States Patent
Koch (10) Patent No.: US 7,412,049 B1
(45) Date of Patent: Aug. 12, 2008

(54) SYSTEM AND METHOD FOR REAL-TIME BLOCKING OF A TELEPHONE CALL

(75) Inventor: Robert A. Koch, Norcross, GA (US)

(73) Assignee: AT&T Delaware Intellectual Property, Inc., Wilmington, DE (US)

( * ) Notice: Subject to any disclaimer, the term of this patent is extended or adjusted under 35 U.S.C. 154(b) by 847 days.

(21) Appl. No.: 10/159,542

(22) Filed: May 31, 2002

(51) Int. Cl.
- *H04M 3/42* (2006.01)
- *H04M 3/00* (2006.01)
- *H04M 1/66* (2006.01)

(52) U.S. Cl. .................. 379/210.02; 379/195; 379/200
(58) Field of Classification Search ............ 379/210.02, 379/196, 200
See application file for complete search history.

(56) References Cited

U.S. PATENT DOCUMENTS

| | | | | |
|---|---|---|---|---|
| 5,263,084 A | 11/1993 | Chaput | ........................ | 379/215 |
| 5,341,414 A | 8/1994 | Popke | ........................ | 379/142 |
| 5,467,388 A * | 11/1995 | Redd et al. | ............. | 379/210.02 |
| 6,028,917 A * | 2/2000 | Creamer et al. | ........ | 379/100.01 |
| 6,215,857 B1 | 4/2001 | Kasiviswanathan | ........ | 379/67.1 |
| 6,269,159 B1 * | 7/2001 | Cannon et al. | ......... | 379/202.01 |
| 6,330,317 B1 | 12/2001 | Garfinkel | .................... | 379/196 |
| 6,744,868 B2 * | 6/2004 | Mani | ..................... | 379/201.02 |
| 2002/0085700 A1 * | 7/2002 | Metcalf | ................. | 379/210.01 |

OTHER PUBLICATIONS

AT&T Bell Labs record titled "LASS: Putting the telephone customer in charge" By C. Brant Hirschmann et al., May 1985.*

* cited by examiner

*Primary Examiner*—Rasha S AL-Aubaidi
(74) *Attorney, Agent, or Firm*—Thomas, Kayden, Horstemeyer & Risley, (57) ABSTRACT

A preferred embodiment of the present invention includes a call blocking service to which a user subscribes. The preferred call blocking service includes maintaining an updateable list of calling parties that the user wishes to block from being able to complete telephone calls to the user, maintaining a buffer for storing information associated with the most recent calling party placing a telephone call to the user, and recognizing a signal that the user activates to automatically add the most recent calling party to the list of calling parties blocked from being able to complete telephone calls to the user.

49 Claims, 5 Drawing Sheets

SYSTEM AND METHOD FOR REAL-TIME BLOCKING OF A TELEPHONE CALL

TECHNICAL FIELD

The invention generally relates to telecommunications, and more specifically, to unsolicited telephone calls.

BACKGROUND OF THE INVENTION

A variety of additional services are available to a user in connection with telephone service, including, for example, call waiting, call forwarding, caller ID, etc. These additional services are designed to enhance the user's telephone service, and to allow the user control over certain aspects of the telephone service.

Frequently, individuals with telephone service receive annoying or nuisance unsolicited calls, including from telemarketing businesses. Some features exist that permit users to subscribe through their telephone service provider and obtain information about the party placing an incoming call to the user. However, these services will not show caller identification data if the calling party has listed its number as private. Additionally, depending on the user's telephone service, calls placed from outside the user's local area will also frequently not display information regarding the calling party.

Additionally, features exist that permit users to specify that they want a telephone network to automatically block incoming calls from private numbers or from specific calling party numbers. However, these services either automatically block all private numbers (or numbers from out of area), or block no numbers. Additionally, services allowing the user to specify individual calling party numbers to be blocked require a user to call the telephone service provider, speak to a customer representative, and identify the number to be blocked. If the user does not have access to the number of the calling party that the user wishes to block, for example, if the calling party has a number listed as private, the user may not be able to identify to the telephone service the number to block.

Therefore, there is a need for a system and method that addresses these and other problems.

SUMMARY OF THE INVENTION

The preferred embodiments of the present invention provide a system and method for enabling a user to select, in real-time, calling parties to be blocked from placing telephone calls to the user.

One preferred embodiment of the present invention provides a call blocking service to which a user subscribes. The preferred call blocking service includes maintaining an updateable list of calling parties that the user wishes to block from being able to complete telephone calls to (i.e. ring) the user, maintaining a buffer for storing information associated with the most recent calling party placing a telephone call to the user, and recognizing a signal that the user activates to automatically add the most recent calling party to the list of calling parties blocked from placing telephone calls to the user.

In accordance with another feature of one preferred embodiment of the present invention, the calling block service may include a call blocking application server that the user may contact via a computer or other web appliance, either through the internet or another connection, in order to view and/or edit the list of calling parties that the user wishes to block from being able to complete telephone calls to the user.

Other features and advantages of the present invention will become apparent to one skilled in the art upon examination of the following detailed description, when read in conjunction with the accompanying drawings. It is intended that all such features and advantages be included herein within the scope of the present invention.

BRIEF DESCRIPTION OF THE DRAWINGS

Many aspects of the invention can be better understood with reference to the following drawings. The components in the drawings are not necessarily to scale, emphasis instead being placed upon clearly illustrating the principles of the present invention. Moreover, in the drawings, like reference numerals designate corresponding parts throughout the several views.

DETAILED DESCRIPTION OF THE PREFERRED EMBODIMENTS

Generally stated, one preferred embodiment of the present invention allows a user to selectively block telephone calls from calling parties in real-time, regardless of whether the calling party is calling from out of area, or has a private number, and without the need to contact customer representatives at a telephone service provider.

Figure 1:
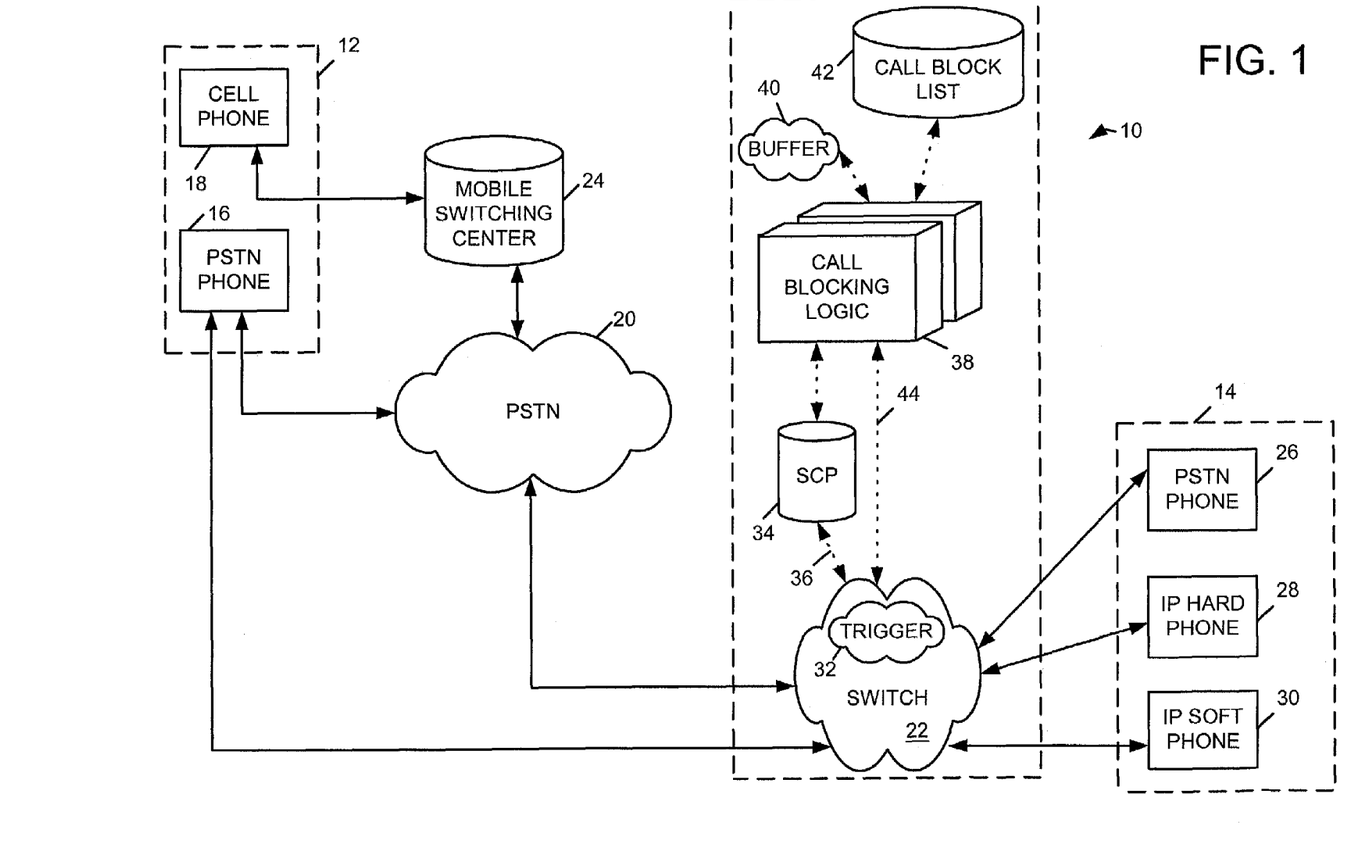
FIG. 1 illustrates an exemplary telephone system that may be used with the exemplary embodiments of the present invention.

FIG. 1 illustrates an exemplary system implementing one embodiment, among others of the present invention in a telephone call from a calling party 12 to a called party 14. In various embodiments, the calling party 12 may be placing a call from a standard Public Switched Telephone Network ("PSTN") telephone 16 or a cellular telephone 18, or other types of telephones. In the case of a PSTN telephone 16, depending on the location of the PSTN telephone 16, the calling party 12 may be routed through the PSTN system 20 to a switch 22 of the called party 14 at the called party's local telephone service provider. In other embodiments, if the calling party 12 shares a local telephone service provider with the called party 14, the telephone call would be routed directly from the PSTN telephone 16 to the switch 22.

Similarly, as depicted in FIG. 1, the calling party 12 may be using for example, a cellular telephone 18 to call the called party 14. In this case, depending on the location of the cellular telephone 18, the calling party 12, may be routed to a Mobile Switching Center 24 servicing the area where the calling party 12 is placing the telephone call on the cellular telephone 18. From the Mobile Switching Center, the calling party 12 would be routed through the PSTN system 20 to the switch 22 for the called party 14. Alternatively, the calling party 12, if located within the coverage area of the local telephone service provider for the called party 14, may be routed directly from the cellular telephone 18 to the switch 22.

As depicted in FIG. 1, the called party 14 may be using a variety of telephones, including, among others, a PSTN telephone 26, an IP hard telephone 28, or an IP soft telephone 30 for example as would be understood by those skilled in the art. Additionally, the local telephone service provider may provide service to the called party 14 via different switches 22, including a standard switched Central Office, or through a digital softswitch implementation, among others.

The system 10 of the present invention may be implemented through a variety of hardware, firmware, and/or software. In one implementation, the system 10 of the present invention may be implemented within a switch 22. In one embodiment, the switch 22 is a digital softswitch with all the below-described functions performed by the softswitch. In yet another implementation of the system 10 of the present invention, the switch 22 may be a Central Office switch with all of the below-described functions performed by the Central Office switch. In yet other embodiments, the system 10 may include a softswitch or Central Office switch in communication with additional separate elements.

In the shown preferred embodiment, among others the called party 14 subscribes to the calling blocking service or system 10. A trigger 32 is placed on the telephone number of the subscribing called party 14. In the preferred embodiment the local telephone service provider provides service through a standard switched Central Office, comprised of switches 22 complying with the Advanced Intelligent Network (AIN). For additional details on the AIN, the reader is referred to the commonly assigned patent to Weisser, Jr., U.S. Pat. No. 5,430,719, which is incorporated herein by reference. In the shown preferred embodiment, the trigger 32 may be a Terminating Attempt Trigger operating under the protocols of the AIN. Additionally, in this preferred embodiment, the system 10 further includes a Service Control Point ("SCP") 34. In some embodiments, the SCP 34 will not operate under the protocols of the AIN, however, in the preferred embodiment, the SCP 34 is an AIN SCP 34.

In a preferred embodiment, when any incoming call for the called party 14 is received at the switch 22, the trigger 32 activates and the switch 22 holds the incoming call. The switch 22 also sends a query 36 to the SCP 34. In the preferred embodiment the query operates under the protocols of the AIN. In other embodiments, the query may be any of a variety of communications between the switch 22 and the SCP 34, as would be known to one skilled in the art. Once the trigger 32 activates, the call is held until the query 36 is resolved. As illustrated in FIG. 1, the switch 22, generates the query 36.

The system 10 further includes in the preferred embodiment, call blocking logic 38. In some embodiments, the call blocking logic 38 will be contained within the switch 22. In some implementations the call blocking logic 38 will be contained within the SCP 34. In other embodiments, the call blocking logic 38 may be contained on a separate server in communication with the SCP 34 and/or switch 22. In implementations where the call blocking logic 38 is on a separate server, the switch 22 may be configured to send a message 44 directly to the call blocking logic 38 server, rather than a query 36 to the SCP 34. In various embodiments, the message 44 may be any of a variety of communications between the switch 22 and the server.

In a preferred embodiment, the system 10 also includes a buffer 40. The buffer 40 stores information concerning a calling party 12 placing a call to the called party 14, including at least a telephone number associated with the calling party 12 and the name of the calling party 12. Note that even if the calling party 12 has a private telephone number, the telephone number of the calling party 12 is known to the local telephone service provider. Accordingly, a private telephone number and name will be stored in the buffer 40, even though the telephone number of the calling party 12 may not be displayed to the called party 14. The telephone number of the calling party 12 is entered or written into the buffer 40 as the "last call from" entry for the called party 14.

Accordingly, in the preferred embodiment, there will be a buffer 40 associated with the called party 14 as part of the called party's 14 subscription to the calling blocking system 10. In the embodiment depicted in FIG. 1, the buffer 40 for each called party 14 subscribing to the system 10 will be contained in the call blocking logic 38. In other embodiments, the buffer 40 may be contained within the switch 22. In yet other embodiments, the buffer 40 may be contained in the SCP 34, on a server collocated with the call blocking logic 38, or on a different server from the call blocking logic 38.

Further, the call blocking logic 38 compares the telephone number associated with the calling party 12 stored in the buffer 40, with a call block list 42. The call block list 42 contains the information associated with calling parties that the called party 14 wishes to block from being able to complete a telephone call to (i.e. ring) the called party 14. In the preferred embodiment, the call block list 42 includes a database. The preferred call block list 42 preferably includes at least a name and a telephone number associated with each calling party 12 on the list of calling parties blocked from being able to ring the called party 14.

The call blocking logic 38 compares the information for the calling party 12 attempting to place a call to the called party 14 to the information contained in the call block list 42 associated with the called party 14 in order to determine whether or not the calling party 12 will be allowed to continue placing the telephone call to the called party 14.

After making the comparison, the call blocking logic 38 replies to the query from the switch 22, either through the SCP 34, or in other embodiments directly to the switch 22 via message 44. If the calling party 12 is not on the call block list 42 as one of the calling parties that the called party 14 wishes to block, the switch 22, upon receiving a response from the call blocking logic 38, will complete the call to the called party 14.

In some implementations, the trigger 32, call blocking logic 38, buffer 40, and call block list 42 are all contained within a switch 22 within a local telephone service provider. In other implementations, the call blocking logic 38, buffer 40, call block list 42 are contained on an SCP 34 communicating with a PSTN Central Office switch 22. In yet other implementations, the call blocking logic 38, buffer 40, and call block list 42 may be contained within a separate server communicating with the switch 22 either directly via a message 44 or through an SCP 34.

Operation

Figure 2:
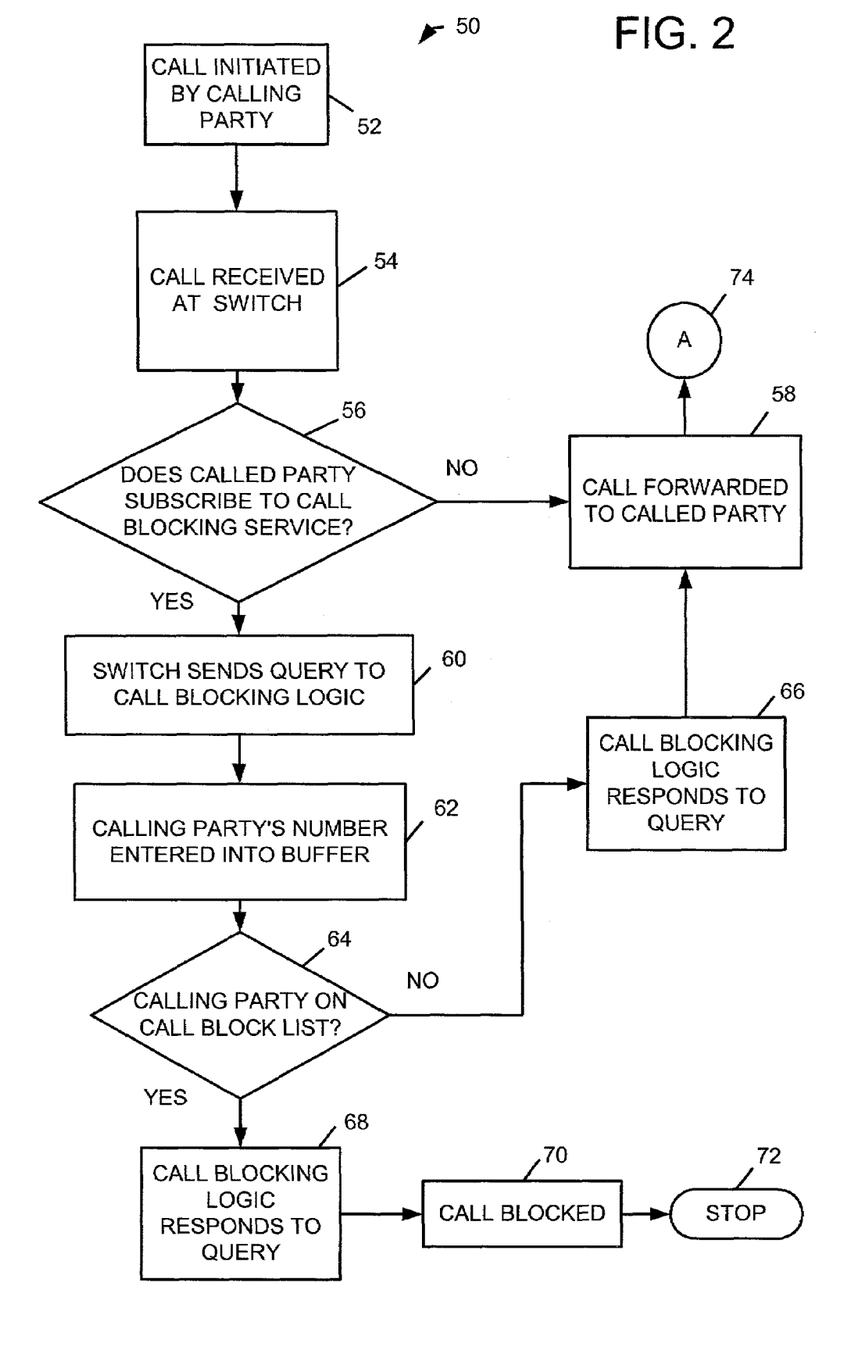
FIG. 2 is a flowchart of selected steps of an embodiment of the present invention when a call is placed on the exemplary system illustrated in FIG. 1.

FIG. 2 is a flowchart showing selected steps 50 of the operation of the system 10 when a calling party 12 (FIG. 1) attempts to place a telephone call to a called party 14 (FIG. 1). In this implementation, a calling party 12 (FIG. 1) initiates a call (step 52). The call is received at the switch 22 (FIG. 1)(step 54). When the call is received at the switch 22 (step 54), determination is made whether the called party 14 (FIG. 1) subscribes to the calling blocking system 10 (FIG. 1) (step 56). This determination may be made by a trigger 32 (FIG. 1) placed on the telephone number of the called party 14 (FIG. 1), or by other methods that would be known to one skilled in the art.

If the called party 14 (FIG. 1) does not subscribe to the system 10 (FIG. 1), the telephone call is forwarded to the called party 141 (FIG. 1)(step 58). If the called party 14 (FIG. 1) does subscribe to the calling blocking system 10 (FIG. 1), the call is halted and a query 36 (FIG. 1) sent to the call blocking logic 38 (FIG. 1)(step 60). The calling party's number is entered into a buffer 40 (FIG. 1) (step 62).

The call blocking logic 38 (FIG. 1) then determines whether or not the calling party 12 (FIG. 1) appears on the called party's call block list 42 (FIG. 1)(step 64). If the calling party 12 (FIG. 1) is not on the called party's call block list 42 (FIG. 1), the call blocking logic 38 (FIG. 1) responds to the query 36 (FIG. 1)(step 66). At that time the telephone call is routed to the called party 14 (FIG. 1)(step 58).

If the calling party 12 (FIG. 1) appears on the called party's call block list 42 (FIG. 1)(step 64), the call blocking logic 38 (FIG. 1) provides that response to the query 36 (FIG. 1)(step 68). At that point, the telephone call from the calling party 12 (FIG. 1) is blocked (step 70), ending the telephone call (step 72). Optionally, among others, a terminating announcement or continued ringing tone may be played to the calling party 12 (FIG. 1).

Figure 3:
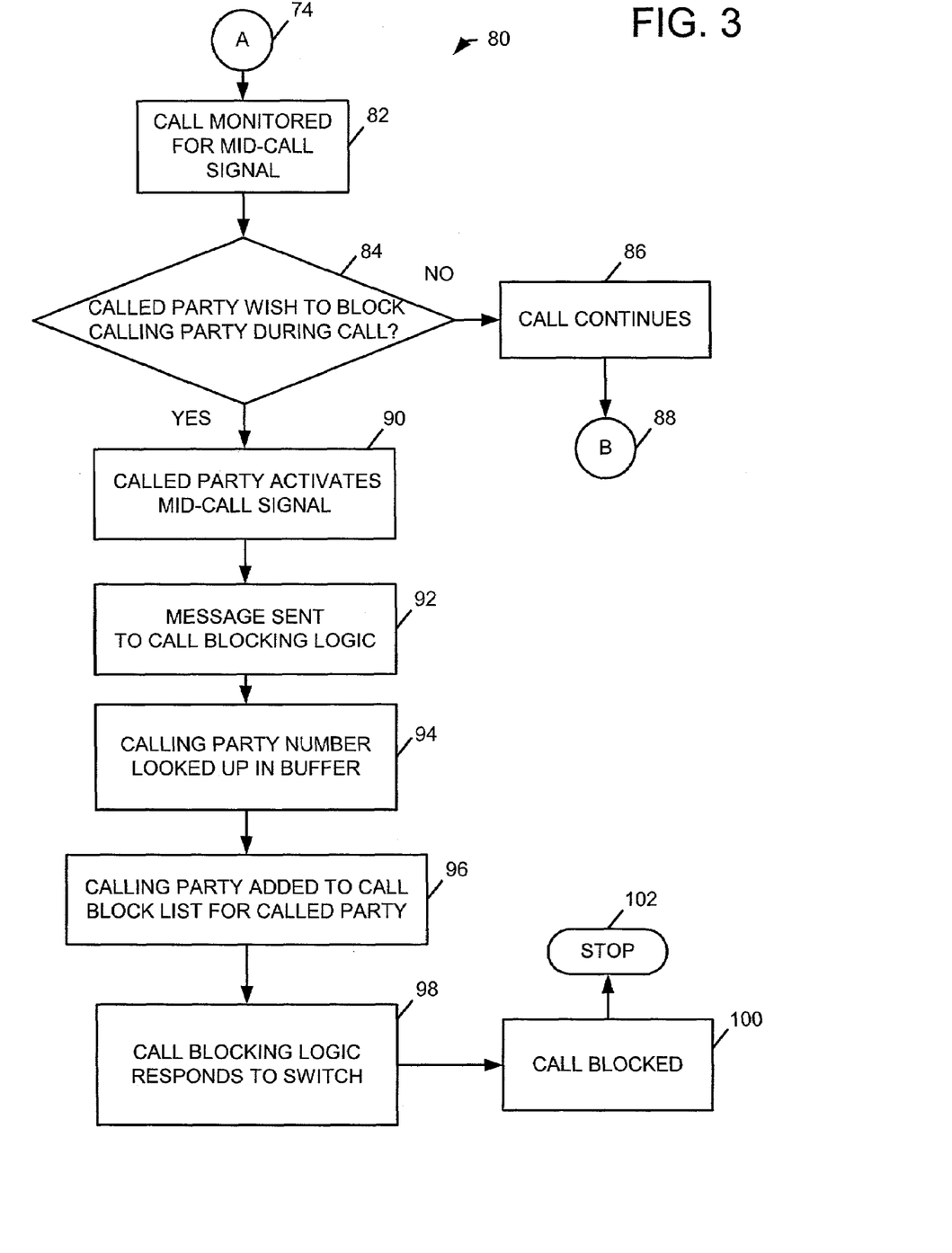
FIG. 3 is a flowchart of selected steps of the embodiment depicted in FIG. 2, when the user adds the calling party to the call block list during the telephone call.

In one preferred embodiment of the present invention, during the telephone call, should the called party 14 (FIG. 1) desire to place the calling party 12 (FIG. 1) on the call block list 42, (FIG. 1), the called party 14 (FIG. 1) may update the call block list 42 (FIG. 1) during the telephone call according to the selected steps 80 depicted in FIG. 3. As depicted in FIG. 3, during the telephone call, the switch 22 (FIG. 1) monitors the telephone call for a mid-call signal from the called party 14 (FIG. 1)(step 82). If during the telephone call, the called party 14 (FIG. 1) does not wish to block the calling party 12 (FIG. 1)(step 84), the telephone call continues (step 86) until completion (step 88) as depicted in FIG. 3. If the called party 14 (FIG. 1) does wish to block the calling party 12 (FIG. 1) during the call (step 84), the called party 14 (FIG. 1) activates the mid-call signal to the switch 22 (FIG. 1)(step 90).

There are various signals that could be used by the system 10 (FIG. 1) to implement a mid-call signal according to step 90, as would be known to one of ordinary skill in the art. For example, and not as a limitation on the present invention, in the event that the called party 14 (FIG. 1) is using a PSTN telephone 26 (FIG. 1), the called party 14 (FIG. 1) may activate a DTMF tone or a switch-hooked flash, signaling to the switch 22 (FIG. 1) in accordance with step 90. In other embodiments, various signals could be implemented by the system 10 (FIG. 1) in order to provide a mid-call signal to the switch 22 (FIG. 1). Including by way of example, a generic sequence of numbers for anyone subscribing to the call blocking service, or a unique PIN-type number for each individual called party 14 (FIG. 1) subscribing to the call blocking service of the preferred embodiment of the present invention.

Upon receiving the mid-call signal from the called party 14 (FIG. 1)(step 90), a message is sent to the call blocking logic 38 (FIG. 1)(step 92). In response to the message (step 92), the call blocking logic 38 (FIG. 1) reads the calling party 12 (FIG. 1) telephone number from the buffer 40 (FIG. 1)(step 94). The calling party 12 (FIG. 1) number stored in the buffer 40 (FIG. 1) is then added to the call block list 42 (FIG. 1) for the called party 14 (FIG. 1)(step 96).

The call blocking logic 38 (FIG. 1) then responds to the switch 22(FIG. 1)(step 98), and the telephone call is blocked, terminating the telephone call (step 100). The calling party 12 (FIG. 1) is also prevented from completing any further telephone calls to the called party 14 (FIG. 1), in accordance with the steps 50 depicted in FIG. 2.

Figure 4:
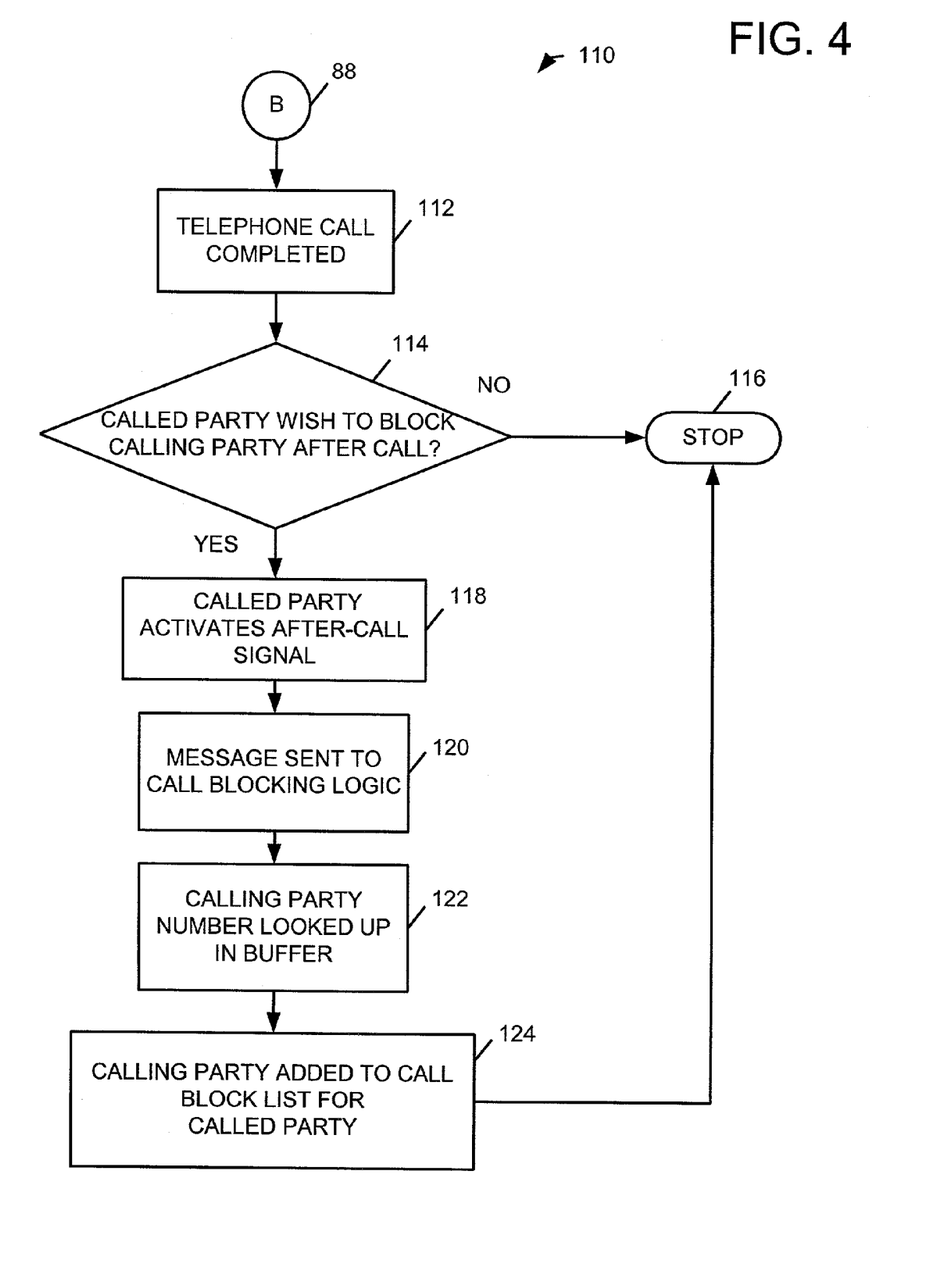
FIG. 4 is a flowchart of selected steps of the embodiment depicted in FIG. 2, when the user desires to add the calling party to the call block list after the telephone call is completed.

In the alternative, as depicted in FIG. 4, should the called party 14 (FIG. 1), desire to place the calling party 12 (FIG. 1), on the call block list 42 (FIG. 1) after the conclusion of the telephone call (step 88), the called party 14 (FIG. 1) may accomplish this in accordance with the selected steps 110 of FIG. 4. As illustrated in FIG. 4, once the telephone call is completed and the connection is terminated (step 112) a called party 14 (FIG. 1) may wish to block the calling party 12 (FIG. 1) from further calls (step 114). Should the called party 14 (FIG. 1) not wish to block the calling party 12 (FIG. 1) after the completion of the telephone call, no further action is needed (step 116).

However, should the called party 14 (FIG. 1) wish to block the calling party 12 (FIG. 1) from placing future telephone calls to the called party 14 (FIG. 1) after the completion of the telephone call, the called party 14 (FIG. 1) activates the after-call signal to the switch 22 (FIG. 1)(step 118). In the preferred embodiment, this after-call signal may be a triggering event such as a Star Feature Code, as would be known to one of ordinary skill in the art. In other implementations, other after-call signals may be used in accordance with the present invention, including various signals by a PSTN telephone 26 (FIG. 1), an IP hard telephone 2, (FIG. 1), and/or IP soft telephone 30 (FIG. 1) to signal the switch 22 (FIG. 1), as would be known to one of ordinary skill in the art.

Upon receiving the after-call signal (step 118), the switch 22 (FIG. 1) sends a message to the call blocking logic 38 (FIG. 1) (step 120). In some embodiments, the switch 22 (FIG. 1) communicates directly with the call blocking logic 38 (FIG. 1). In other embodiments, the switch 22 (FIG. 1) will communicate with the call blocking logic 38 (FIG. 1) though the SCP 34 (FIG. 1).

In response to the message (step 120), the call blocking logic 38 (FIG. 1) reads the telephone number for the calling party 12 (FIG. 1) from the buffer 40 (FIG. 1) (step 122). The telephone number of the calling party 12 (FIG. 1) is then added to the called party's call block list 42 (FIG. 1) (step 124), thereby insuring that the calling party 12 (FIG. 1) may no longer place telephones to the called party 14 (FIG. 1) in accordance with the selected steps 50 of FIG. 2.

Review of the Blocked Calling Parties

Figure 5:
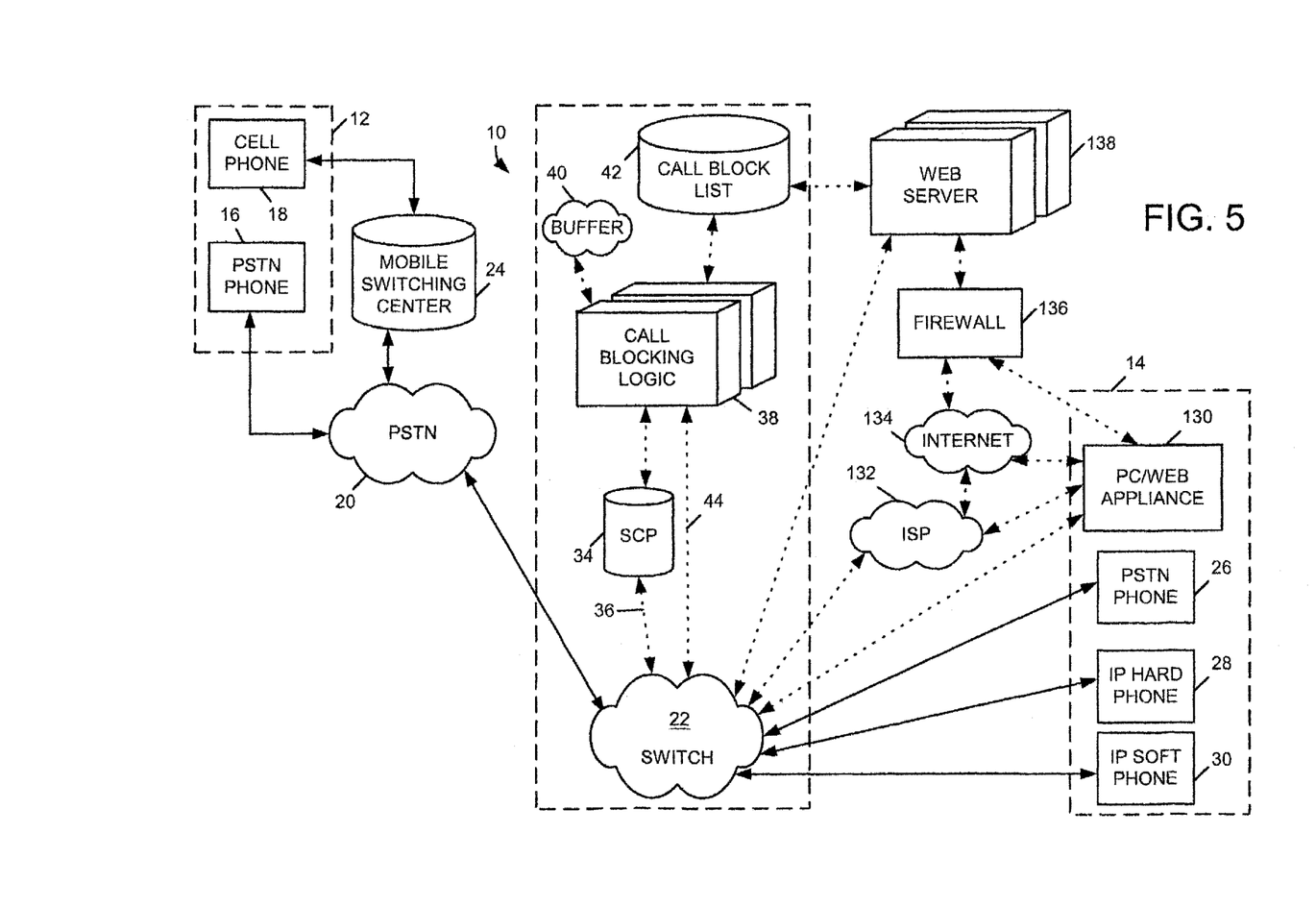
FIG. 5 illustrates an exemplary embodiment of an additional feature of the embodiment depicted in FIG. 1.

In addition, in accordance with another feature of the present system 10, in some implementations, the called party 14 subscribing to the system 10 will be able to view and/or edit the call block list 42 via a computer or other networked data appliance 130. FIG. 5 depicts a preferred embodiment where the call block list 42 is accessible by a web server 138. In some embodiments the web server 138 will be the same server on which the call blocking application 38 and call block list 42 reside. In other embodiments, the call blocking application 38 and call block list 42 will reside on a separate server from the web server 138, both servers co-located. In yet other embodiments, the web server 138 will be completely remote from the call blocking application 38 server.

As depicted in FIG. 5, there are various alternative ways the called party 14 may communicate with the server containing the call block list 42. In some embodiments, the called party 14 will use a computer 130 to communicate with the web server 138 through the called party's Internet Service Provider ("ISP") 132 connected to a data network, such as the Internet 134. In this implementation, the web server 138 is in communication with the data network, for instance the Internet 134.

In various embodiments, the called party 14 may communicate directly to the Internet 134 rather than through an ISP 132, or the called party may communicate directly with the web server 138 through the firewall 136. In yet other embodiments, the local telephone service provider 22 may also act as the ISP 132 for the called party 14. In the preferred embodiment, the web server 138 will be protected by a firewall 136 to ensure security.

In yet other embodiments, the called party 14 may access the web server 138 directly through the local telephone service provider, without the need to access an ISP 132 or the Internet 134. In such embodiments, the web server 138 may be located within the local telephone service provider, or may be a remote server in communication with the local telephone service provider, and the called party 14 establishes a connection with the local telephone service provider. In this embodiment, the local telephone service provider does not act as an ISP 132 for the called party 14, but provides the called party 14 a connection to the server containing the call block list 42.

In the preferred embodiment, the called party 14 will only be able to view and/or edit the call block list 42 for that called party 14, and will not be able to view or edit the call block list 42 for other subscribers to the system 10. In the preferred embodiment, the called party 14 will be able to view the information stored on the call block list 42 for each calling party 12 on the list of calling parties to be blocked. This information may include the name and telephone number of the calling parties on the list, as well as other information. The called party 14 can communicate with the server containing the call block list 42 in a variety of manners, including through the use of selectable menus, a graphical user interface, or other methods, including those disclosed in the commonly assigned patent to Koch, et al., U.S. patent application Ser. No. 10/012,746, which is incorporated herein by reference.

In the preferred embodiment, the call block list 42 will be presented to the called party 14 as a numbered list, in reverse chronological order by date that each calling party to be blocked was added to the call block list 42. In other embodiments, the information may be ordered in alternative ways including alphabetically by calling party name, numerically by calling party telephone number, etc. Additionally, the information may appear in database, spreadsheet, or other format. In yet other embodiments, the called party 14 will be able to select the format for the call block list 42, including the ordering of the information within the desired format.

Note that calling parties with private numbers will appear on the call block list 42, however, the identifying information for these calling parties will be masked. For example, in the preferred embodiment, the web server 138 will display only the word "private" for the name and the word "private" for the telephone number of calling parties with telephone numbers designated private. However, other information, such as the date that a calling party 12 with a private number was added to the call block list 42 may be displayed to the called party 14 through the web server 138. In other embodiments, other terms may be used to mask the information for calling parties with telephone numbers marked private.

In addition to viewing the call block list 42, the called party 14 will be able to edit the list, including deleting calling parties from the call block list 42. If the called party 14 deletes a calling party 12 from the call block list 42, that calling party 12 will once again be able to place telephone calls to the called party in accordance with the steps 50 of FIG. 2. The deletion of calling parties from the call block list 42 may be accomplished in a variety of methods, including selectable menus, a graphical user interface, or other methods, including those disclosed in the commonly assigned patent to Koch, et al., U.S. patent application Ser. No. 10/012,746, incorporated herein by reference.

In some embodiments, when accessing the call block list 42 via the called party's computer or web appliance 130, the called party 14, may add the last calling party 12 to place a telephone call to the called party 14 to the call block list 42. In the preferred embodiment, the buffer 40 stores information until a new telephone call is placed, or attempted to be placed, in accordance with the steps 50 of FIG. 2. Accordingly, at any time after a calling party 12 places a telephone call to the called party 14, up until the next telephone call for the called party 14, the buffer 40 will contain the information relating to the last calling party 12. The information contained in the buffer 40 is not overwritten until a new telephone call to the called party 14 is attempted.

Accordingly, if after a telephone call, the called party 14 desires to review the call block list 42, the called party 14 may communicate with the web server 138 via the called party's computer or web appliance 130 as discussed above. When communicating with the web server 138, the called party 14 may desire to add the most recent calling party 12 to the call block list 42. In the preferred embodiment, the web server 138 will allow the called party 14 to add the most recent calling party 12 stored in the buffer 40 to the call block list 42 via the called party's computer or web appliance 130. The addition of calling parties to the call block list 42 may be accomplished in a variety of methods, including selectable menus, a graphical user interface, or other methods, including those disclosed in the commonly assigned patent to Koch, et al., U.S. patent application Ser. No. 10/012,746, incorporated herein by reference.

In addition, in the preferred embodiment, prior to deciding whether to add the last calling party 12 in the buffer 40 to the call block list 42, the called party 14 will be able to view the information contained in the buffer 40 for the last calling party 12. When directed by the called party 14, and the web server 138 will access the buffer 40, and display the information contained in the buffer 40 to the called party 14. After reviewing the information, the called party 14 will be able to select the calling party 12 stored in the buffer 40 for addition to the call block list 42. In this manner the called party 14 will be able to review the last calling party 12 before deciding whether to add this calling party 12 to the call block list 42.

It should be emphasized that the above-described embodiments of the present invention, particularly, any "preferred" embodiments, are possible examples of implementations, merely set forth for a clear understanding of the principles of the invention. Many variations and modifications may be made to the above-described embodiment(s) of the invention without departing substantially from the spirit and principles of the invention. All such modifications and variations are intended to be included herein within the scope of the present invention and protected by the claims.

The invention claimed is:

1. A system for real-time blocking telephone calls, the telephone calls placed by a calling party to a called party, the system comprising:

call blocking logic configured with a blocked caller list, the blocked caller list comprising at least one calling party to be blocked from being able to complete telephone calls to the called party; and a buffer, the buffer storing at least a telephone number associated with a most recent calling party from which the called party has received a telephone call, wherein the call blocking logic is configured to respond to an update signal to add the telephone number contained in the buffer to the blocked caller list that can be edited for review by the user before adding the calling party to the blocked caller list, wherein the update signal is received during the telephone call from the most recent calling party to the called party such that the blocked caller list is edited for review during the call and the call is blocked, terminating the call.

2. The system of claim 1, wherein the call blocking logic is a switch, the switch configured to receive telephone calls intended for the called party, and to block telephone calls to the called party placed by calling parties that appear on the blocked caller list.

3. The system of claim 2, wherein the blocked caller list is maintained within a memory of the switch.

4. The system of claim 3, wherein the switch is further configured to receive the update signal from the called party, and to add the telephone number stored in the buffer to the blocked caller list.

5. The system of claim 4, wherein, the buffer comprises a memory location within the switch.

6. The system of claim 5, wherein the switch is a softswitch.

7. The system of claim 5, wherein the switch is a Central Office switch.

8. The system of claim 7, wherein the Central Office switch operates under the AIN protocols.

9. The system of claim 8, wherein the call blocking logic further comprises a service control point, the service control point operating under the AIN protocols.

10. The system of claim 2, wherein the update signal further comprises a signal from the called party to the switch.

11. The system of claim 10, wherein the update signal further comprises a signal sent from the called party to the switch after the conclusion of a telephone call.

12. The system of claim 11, wherein the update signal comprises a Star Feature Code.

13. The system of claim 11, wherein the update signal comprises a signal from an IP telephone.

14. The system of claim 2, wherein the call blocking logic further comprises a call blocking server, wherein the call blocking server communicates with the switch, and wherein the blocked caller list is stored on the call blocking server.

15. The system of claim 14, wherein the buffer is located on the call blocking server.

16. The system of claim 15, wherein, the call blocking server is contained within a softswitch.

17. The system of claim 14, wherein the call blocking server is configured to allow the called party to communicate with the call blocking server.

18. The system of claim 17, wherein the communication comprises HTML communications from a computer operated by the called party.

19. The system of claim 18, wherein the call blocking server is further configured to allow the called party to edit information stored on the call blocking server.

20. The system of claim 19, wherein the information edited by the called party comprises the blocked caller list.

21. The system of claim 1, wherein the signal comprises a DTMF tone.

22. The system of claim 21, wherein the signal comprises a DTMF tone from a PSTN telephone.

23. The system of claim 1, wherein the signal comprises a signal from an IP telephone.

24. A method for a called party to block a telephone call from at least one selected calling party in real-time, the method comprising:
   subscribing to a call blocking service, the call blocking service including a list of calling parties that the called party desires to block;
   receiving a telephone call from an unwanted calling party that the called party desires to block; and
   sending a signal to the call blocking service to place the unwanted calling party on the list of calling parties the called party desires to block that can be edited for review by the user before adding the calling party to the list of calling parties, wherein the signal is sent during the telephone call from the unwanted calling party such that the blocked caller list is edited for review during the call and the call is blocked, terminating the call.

25. The method of claim 24, wherein sending a signal to the call blocking service further comprises using the telephone of the called party to send the signal to the call blocking service.

26. The method of claim 25, wherein sending a signal to the call blocking service further comprises using the telephone of the called party to send a DTMF tone to the call blocking service.

27. The method of claim 24, wherein sending a signal to the call blocking service further comprises using the telephone of the called party to send the signal to the call blocking service after the telephone call from the unwanted calling party.

28. The method of claim 27, wherein the telephone of the called party comprises an IP telephone.

29. The method of claim 27, wherein the telephone of the called party comprises a PSTN telephone.

30. The method of claim 24, wherein the call blocking service further includes a call blocking service server.

31. The method of claim 30, wherein the list of calling parties the called party desires to block is located on the call blocking service server.

32. The method of claim 31, wherein the call blocking service server is configured to allow the called party to communicate with the call blocking service server.

33. The method of claim 32, wherein the communication between the called party and the call blocking service server comprises HTML communications from a computer operated by the called party.

34. The method of claim 33, wherein the call blocking service server is further configured to allow the called party to view information stored on the call blocking service server.

35. The method of claim 34, wherein the information on the call blocking service server viewed by the called party comprises the list of calling parties the called party desires to block.

36. The method of claim 35, wherein the information on the call blocking service server may be edited by the called party.

37. The method of claim 36, wherein editing the information on the call blocking service server further comprises deleting a calling party from the list of calling parties the called party desires to block.

38. The method of claim 37, wherein editing the information on the call blocking service server further comprises adding a calling party to the list of calling parties the called party desires to block.

39. A method for a called party to block a telephone call from at least one selected calling party in real-time, the method comprising:
   providing a call blocking service, the call blocking service including a list of calling parties that the called party desires to block, the call blocking service further including a buffer;
   sending a telephone call to the called party from a calling party;
   storing information associated with the calling party in the buffer;
   receiving a signal from the called party that the called party desires to block the calling party, wherein the signal is received during the telephone call from the calling party to the called party such that the blocked caller list is edited for review during the call and the call is blocked, terminating the call; and placing the calling party on the list of calling parties the called party desires to block that can be edited for review by the user before adding the calling party to the list of calling parties.

40. The method of claim 39, wherein receiving a signal from the called party further comprises receiving a signal from the telephone of the called party.

41. The method of claim 39, wherein receiving a signal from the called party further comprises receiving a signal from the telephone of the called party after the telephone call from the calling party.

42. The method of claim 39, wherein the call blocking service further includes a call blocking service server.

43. The method of claim 42, wherein the list of calling parties is stored on the call blocking service server.

44. The method of claim 43, wherein receiving a signal from the called party further comprises receiving a communication to the call blocking service server.

45. A method for a called party to block a telephone call from at least one selected calling party in real-time, the method comprising:

subscribing to a call blocking service, the call blocking service including a list of calling parties that the called party desires to block;

receiving a telephone call from an unwanted calling party that the called party desires to block;

sending a signal to the call blocking service to place the unwanted calling party on the list of calling parties the called party desires to block that can be edited for review by the user during the call before adding the calling party to the list of calling parties resulting in a blocking of the telephone call, thereby terminating the call; and editing the list of calling parties.

46. The method of claim 45, further including:
accessing a web server having the list of calling parties using a web compliant device.

47. The method of claim 46, further including:
maintaining the list of calling parties on a web server; and
enabling the called party to access the list via a web compliant device.

48. The method of claim 45, further including:
viewing the list of calling parties.

49. A method for a called party to block a telephone call from at least one selected calling party in real-time, the method comprising:

providing a call blocking service, the call blocking service including a list of calling parties that the called party desires to block, the call blocking service further including a buffer;

sending a telephone call to the called party from a calling party;

storing information associated with the calling party in the buffer;

receiving a signal from the called party that the called party desires to block the calling party;

blocking the call, thereby terminating the call;

placing the calling party on the list of calling parties the called party desires to block that can be edited for review by the user during the call before adding the calling party to the list of calling parties; and enabling the called party to edit the list of calling parties.

* * * * *